US012754465B2

(12) United States Patent
Lu et al.

(10) Patent No.: US 12,754,465 B2
(45) Date of Patent: Oct. 6, 2026

(54) HEAT DISSIPATION MODULE AND PROJECTION DEVICE

(71) Applicant: Coretronic Corporation, Hsin-Chu (TW)

(72) Inventors: Cheng-Han Lu, Hsin-Chu (TW); Min-Hsueh Lee, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 240 days.

(21) Appl. No.: 18/467,742

(22) Filed: Sep. 15, 2023

(65) Prior Publication Data

US 2024/0094612 A1 Mar. 21, 2024

(30) Foreign Application Priority Data

Sep. 16, 2022 (CN) ........................ 202211126612.6

(51) Int. Cl.
*G03B 21/16* (2006.01)

(52) U.S. Cl.
CPC .................................... *G03B 21/16* (2013.01)

(58) Field of Classification Search
CPC .. G03B 21/145; G03B 21/16; G03B 21/2026; G03B 21/2033; G02B 7/008; H04N 9/3144; G02F 1/133382; F25B 2321/021; F25B 2321/0212; F25B 2321/025
See application file for complete search history.

(56) References Cited

U.S. PATENT DOCUMENTS

| | | | | | |
|---|---|---|---|---|---|
| 6,574,967 | B1 | 6/2003 | Park et al. | | |
| 2008/0078187 | A1* | 4/2008 | Ye | F25B 21/02 | 62/3.7 |
| 2009/0207606 | A1* | 8/2009 | Tsao | H10N 10/17 | 362/234 |

(Continued)

FOREIGN PATENT DOCUMENTS

| | | |
|---|---|---|
| CA | 2109543 | 5/1994 |
| CN | 2783219 | 5/2006 |

(Continued)

OTHER PUBLICATIONS

"Office Action of China Counterpart Application", issued on Apr. 18, 2026, pp. 1-13.

*Primary Examiner* — Pascal M Bui Pho
(74) *Attorney, Agent, or Firm* — JCIPRNET

(57) ABSTRACT

A heat dissipation module disposed in a projection device and dissipating heat from a heat source includes a heat dissipation member, a thermoelectric cooler, a heat conduction member, and a sealant. The thermoelectric cooler has a heat absorbing surface, a heat dissipating surface contacting the heat dissipation member, and a first side surface adjacent between the heat absorbing surface and the heat dissipating surface. The heat conduction member has a first contact surface, a second contact surface opposite to the first contact surface, and a second side surface adjacent between the first and the second contact surfaces. The first contact surface contacts the heat source, and at least part of the second contact surface contacts the heat absorbing surface. The sealant is filled between the heat dissipation member and the heat source to cover the first side surface and the second side surface. A projection device is also provided.

20 Claims, 3 Drawing Sheets

(56) References Cited

U.S. PATENT DOCUMENTS

| | | | | |
|---|---|---|---|---|
| 2013/0335989 | A1* | 12/2013 | Sato | F21S 41/24<br>427/67 |
| 2018/0263139 | A1* | 9/2018 | Chang | G05D 23/19 |
| 2020/0341328 | A1* | 10/2020 | Guo | G03B 21/006 |
| 2020/0341358 | A1* | 10/2020 | Hou | H05K 7/20 |

FOREIGN PATENT DOCUMENTS

| | | |
|---|---|---|
| CN | 201234434 | 5/2009 |
| CN | 101547583 | 9/2009 |
| CN | 201724275 | 1/2011 |
| CN | 213276237 | 5/2021 |
| CN | 216123394 | 3/2022 |
| JP | 2002244101 | 8/2002 |
| KR | 20000005625 | 1/2000 |
| KR | 200309470 | 4/2003 |
| TW | 201108537 | 3/2011 |
| TW | 201821893 | 6/2018 |
| WO | 2021235756 | 11/2021 |

* cited by examiner

HEAT DISSIPATION MODULE AND PROJECTION DEVICE

CROSS-REFERENCE TO RELATED APPLICATION

This application claims the priority benefit of China application serial no. 202211126612.6, filed on Sep. 16, 2022. The entirety of the above-mentioned patent application is hereby incorporated by reference herein and made a part of this specification.

BACKGROUND

Technical Field

The disclosure relates to a heat dissipation module and a projection device.

Description of Related Art

A projection device is a display device used to produce large-size images. An imaging principle of the projection device is to convert an illumination beam generated by an illumination system into an image beam by a light valve in an optical engine module, and then project the image beam onto a screen, projection surface, or wall through a projection lens module. In this process, both a light source of the illumination system and relevant optical components that provide beam conversion are often accompanied by heat accumulation, so how to provide effective heat dissipation for these optical components becomes one of the issues of projection technology.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

An embodiment of the disclosure provides a heat dissipation module disposed in a projection device to dissipate heat from a heat source. The heat dissipation module includes a heat dissipation member, a thermoelectric cooler, a heat conduction member, and a sealant. The thermoelectric cooler has a heat absorbing surface, a heat dissipating surface, and a first side surface. The first side surface is adjacent to and located between the heat absorbing surface and the heat dissipating surface, and the heat dissipating surface of the thermoelectric cooler contacts the heat dissipation member. The heat conduction member has a second side surface, a first contact surface, and a second contact surface opposite to the first contact surface. The second side surface is adjacent to and located between the first contact surface and the second contact surface, the first contact surface contacts the heat source, and at least part of the second contact surface contacts the heat absorbing surface. The sealant is filled between the heat dissipation member and the heat source to cover the first side surface and the second side surface. The heat generated by the heat source is transmitted to the heat dissipation member through the first contact surface, the second contact surface, the heat absorbing surface, and the heat dissipating surface in sequence.

An embodiment of the disclosure provides a projection device including an illumination system, a light modulator, a heat dissipation module, and a projection lens. The illumination system is configured to generate an illumination beam. The light modulator is located on a transmission path of the illumination beam to convert the illumination beam into an image beam. The projection lens is located on a transmission path of the image beam to project the image beam out of the projection device. The heat dissipation module is configured to dissipate heat from a heat source disposed in the projection device. The heat source is a light source module of the illumination system or the light modulator. The heat dissipation module includes a heat dissipation member, a thermoelectric cooler, a heat conduction member, and a sealant. The thermoelectric cooler has a heat absorbing surface, a heat dissipating surface, and a first side surface. The first side surface is adjacent to and located between the heat absorbing surface and the heat dissipating surface. The heat dissipating surface of the thermoelectric cooler contacts the heat dissipation member. The heat conduction member has a second side surface, a first contact surface, and a second contact surface opposite to the first contact surface. The second side surface is adjacent to and located between the first contact surface and the second contact surface, the first contact surface contacts the heat source, and at least part of the second contact surface contacts the heat absorbing surface. The sealant is filled between the heat dissipation member and the heat source to cover the first side surface and the second side surface. The heat generated by the heat source is transmitted to the heat dissipation member through the first contact surface, the second contact surface, the heat absorbing surface, and the heat dissipating surface in sequence.

Other objectives, features and advantages of the disclosure will be further understood from the further technological features disclosed by the embodiments of the disclosure where in there are shown and described preferred embodiments of this disclosure, simply by way of illustration of modes suit to best out the disclosure.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations herein is meant to encompass the items listed thereafter and equivalents thereof as well as additional items. Unless limited otherwise, the terms "connected," "coupled," and "mounted" and variations therein are used broadly and encompass direct and indirect connections, couplings, and mountings. Similarly, the terms "facing," "faces" and variations therein are used broadly and encompass direct and indirect facing, and "adjacent to" and variations therein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" "component is directly "adjacent to" "B" component or one or more additional components are between "A" component and "B" component. Accordingly, the drawings and descriptions will be regarded as illustrative in nature and not as restrictive.

The disclosure provides a heat dissipation module and a projection device, which cover side surfaces of a thermoelectric cooler and a heat conduction member with a sealant, and are effectively isolated from the external environment to improve heat dissipation efficiency.

To make the aforementioned more comprehensive, several embodiments accompanied with drawings are described in detail as follows.

Figure 1:
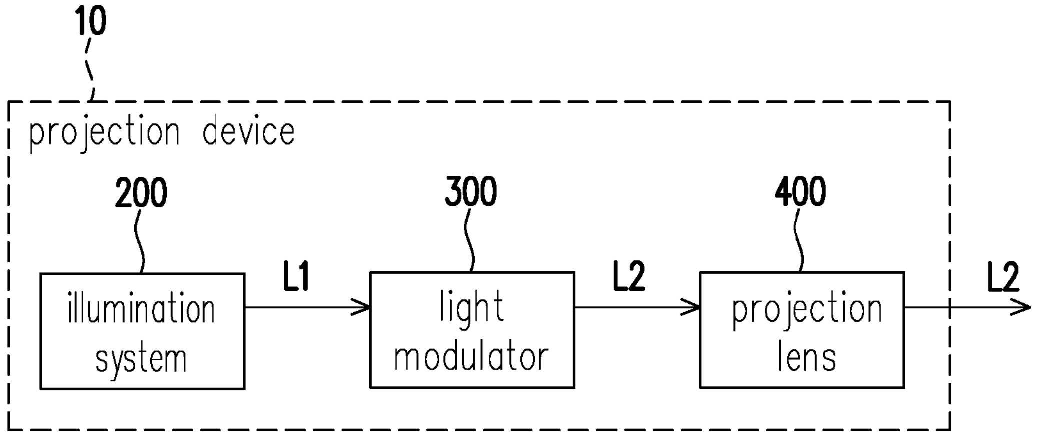
FIG. 1 is a simple block diagram of a projection device according to an embodiment of the disclosure.
Figure 2:
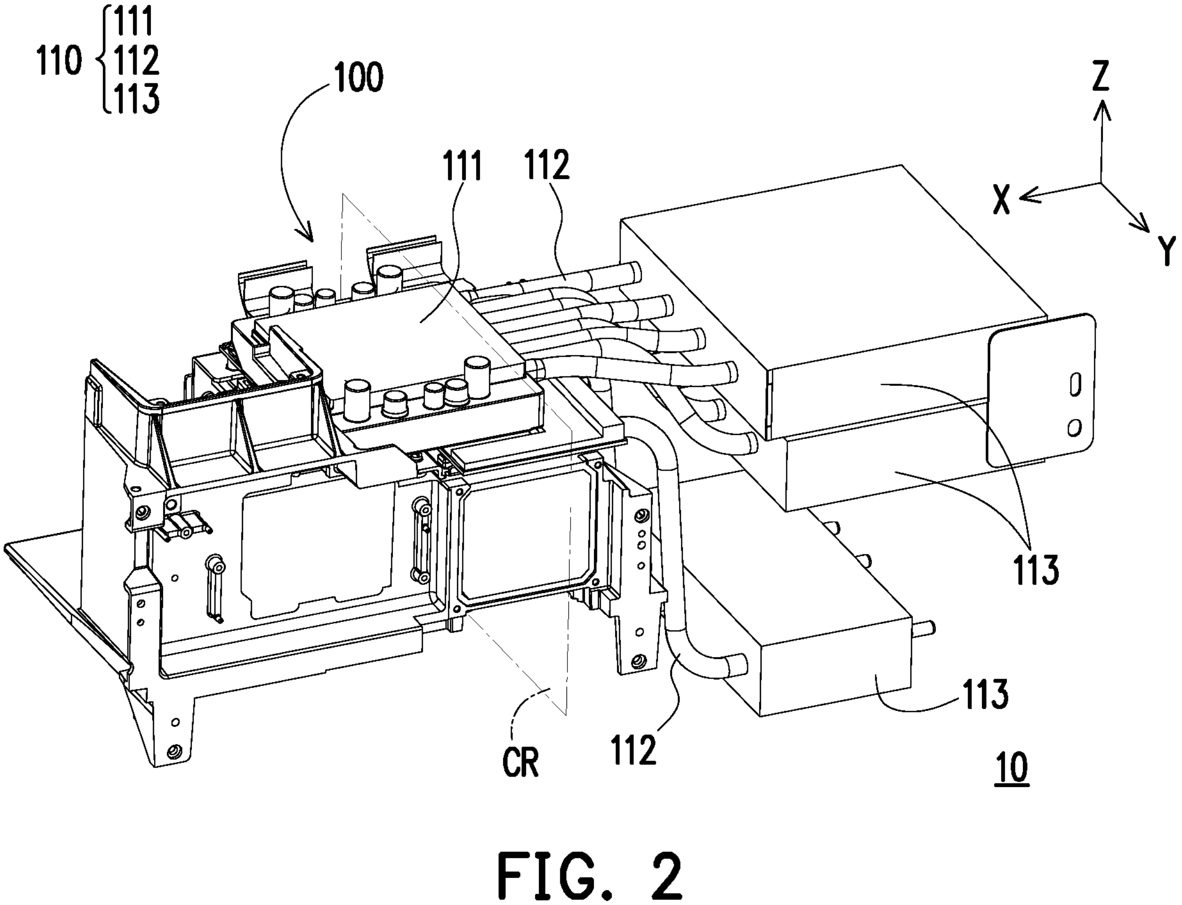
FIG. 2 is a schematic diagram of an internal structure of the projection device in FIG. 1.
Figure 3:
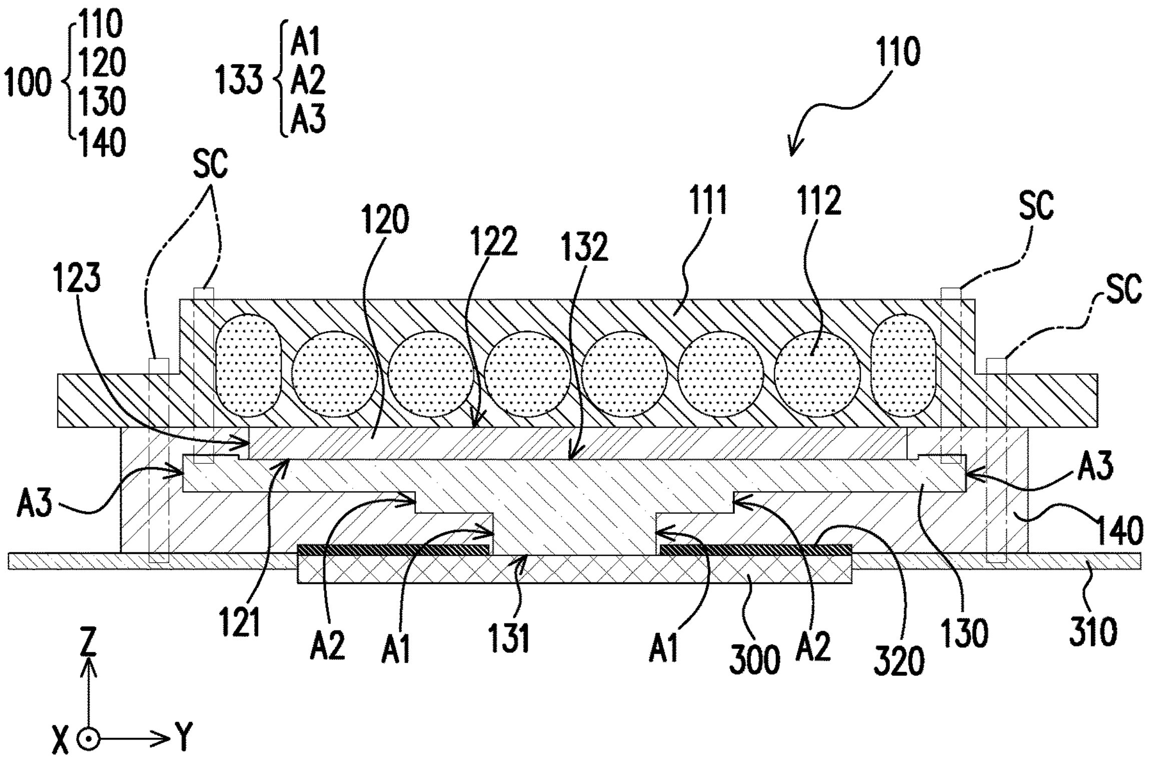
FIG. 3 is a partial cross-sectional diagram of the internal structure of the projection device in FIG. 2.

FIG. 1 is a simple block diagram of a projection device according to an embodiment of the disclosure. FIG. 2 is a schematic diagram of an internal structure of the projection device in FIG. 1. FIG. 3 is a partial cross-sectional diagram of the internal structure of the projection device in FIG. 2, which is, for example, a cross-sectional structure generated along a plane CR. Coordinates X-Y-Z are also provided for component description. Referring to FIG. 1 to FIG. 3, in this embodiment, a projection device 10 includes an illumination system 200, a light modulator 300, a projection lens 400, and a heat dissipation module 100. The illumination system 200 is configured to generate an illumination beam L1. The light modulator 300 is located on a transmission path of the illumination beam L1 to convert the illumination beam L1 into an image beam L2. The projection lens 400 is located on a transmission path of the image beam L2 to project the image beam L2 out of the projection device 10.

In this embodiment, the light modulator 300 is, for example, a reflective light modulator such as a liquid crystal on silicon panel (LCoS panel) or a digital micro-mirror device (DMD). In some embodiments, the light modulator 300 may also be a transparent light modulator such as a transparent liquid crystal panel, an electro-optical modulator, a magneto-optic modulator, or an acousto-optic modulator (AOM). The disclosure does not limit the type and the variety of the light modulator 300. Detailed steps and implementation of a method of converting the illumination beam L1 to the image beam L2 by the light modulator 300 may be adequately taught, suggested and implemented by the usual knowledge in the field, and therefore will not be repeated in the following. In this embodiment, a number of the light modulator 300 is one. The projection device 10, for example, uses a single DMD, but in other embodiments multiple DMDs may be used, and the disclosure is not limited thereto.

The projection lens 400 is configured to receive the image beam L2 from the light modulator 300, and includes, for example, a combination of one or more optical lenses with diopter. The optical lens includes, for example, a non-planar lens such as a biconcave lens, a biconvex lens, a concave-convex lens, a convex-concave lens, a plano-convex lens, a plano-concave lens, etc., or various combinations thereof. In one embodiment, the projection lens 400 may further include a flat optical lens to project the image beam L2 to a projection target in a reflective manner. The disclosure does not limit the type and the variety of the projection lens 400.

Referring to FIG. 2 and FIG. 3 again, it should be noted that the heat dissipation module 100 according to this embodiment is configured to dissipate heat from a heat source disposed in the projection device 10. The heat source may be a light source module of the illumination system 200 or the light modulator 300, and the reflective light modulator 300 is used as an example here.

The heat dissipation module 100 includes a heat dissipation member 110, a thermoelectric cooler 120, a heat conduction member 130, and a sealant 140. The heat dissipation member 110 includes a heat absorbing block 111, multiple heat pipes 112, and a fin set 113. The heat absorbing block 111 receives the heat generated from the heat source, so that the heat received by the heat absorbing block 111 is transmitted to the fin set 113 through fluid phase transition in the heat pipe 112, and then the heat of the fin set 113 is dissipated out of the projection device 10 by, for example, a fan.

Furthermore, the thermoelectric cooler (TEC) 120 has a heat absorption surface 121, a heat dissipation surface 122, and a first side surface 123. The first side surface 123 is adjacent to and located between the heat absorption surface 121 and the heat dissipation surface 122. The heat dissipation surface 122 of the thermoelectric cooler 120 contacts the heat absorption block 111 of the heat dissipation member 110. In this embodiment, the heat conduction member 130 is, for example, a copper plate, and in other embodiments, the heat conduction member 130 may be other metal plate with heat conduction function. The heat conduction member 130 has a second side surface 133, a first contact surface 131 and a second contact surface 132 opposite to the first contact surface 131. The second side surface 133 is adjacent to and located between the first contact surface 131 and the second contact surface 132. The first contact surface 131 of the heat conduction member 130 contacts the heat source, and at least part of the second contact surface 132 of the heat conduction member 130 contacts the heat absorbing surface 121 of the thermoelectric cooler 120. The heat generated by the heat source is transmitted to the heat absorption block 111 of the heat dissipation member 110 through the first contact surface 131 of the heat conduction member 130, the second contact surface 132 of the heat conduction member 130, the heat absorbing surface 121 of the thermoelectric cooler 120, and the heat dissipating surface 122 of the thermoelectric cooler 120 in sequence, and then the heat is dissipated out of the projection device 10 as described above.

It should be noted that, as shown in FIG. 3, the first side surface 123 of the thermoelectric cooler 120 surrounds and is adjacent to the heat absorbing surface 121 and the heat dissipating surface 122 of the thermoelectric cooler 120, while the second side surface 133 of the heat conduction member 130 surrounds and is adjacent to the first contact surface 131 and the second contact surface 132 of the heat conduction member 130. Thus, when the sealant 140 is filled between the heat dissipation member 110 and the heat source, and covers the first side surface 123 of the thermoelectric cooler 120 and the second side surface 133 of the heat conduction member 130, an isolation effect to the outside world is produced for the thermoelectric cooler 120 and the heat conduction member 130. That is, for the heat conduction member 130, the heat conduction member 130 is coated with the sealant 140 except for the first contact surface 131 and the second contact surface 132. For the thermoelectric cooler 120, the thermoelectric cooler 120 is coated with the sealant 140 except for the heat absorbing surface 121 and the heat dissipating surface 122.

In this way, the airtightness and thermal insulation are achieved by the arrangement of the sealant 140, which not only prevents heat from escaping to affect the remaining components of the projection device 10 during heat conduction, but also prevents the heat absorbing surface 121 (cooling end) of the thermoelectric cooler 120 from contacting a high temperature environment to cause condensation (on the other hand, this also prevents high temperature and high humidity air from contacting the heat absorbing surface 121 of the thermoelectric cooler 120), so as to avoid water from affecting or even damaging internal related components of the projection device 10.

In this embodiment, the sealant 140 is made of a material with low thermal conductivity and good fluidity. The thermal conductivity of the sealant 140 is less than 10 W/m K to achieve the thermal insulation effect and avoid condensation. Viscosity of the sealant 140 before curing is between 300 centipoise (cp) and 12000 centipoise (cp), which allows the sealant 140 to be smoothly filled in the small and uneven space between the heat dissipation member 110 and the heat source. Furthermore, the sealant 140 according to this embodiment forms a compressed elastomer after curing, and Shore hardness of the sealant 140 after curing is less than 80, so as to provide tightness, cushioning, and air tightness between the components, and to eliminate the possibility of allowing the thermoelectric cooler 120 and the heat conduction member 130 to contact the external environment. Accordingly, the sealant 140 according to this embodiment may be made of siloxane, polyisocyanate (PIR), or polyurethane (PUR), etc., which also allows the sealant 140 to have good removability and facilitates removal or rework (avoiding residual sealant between components).

Referring to FIG. 3 again, in this embodiment, the heat source is the light modulator 300. An area of the first contact surface 131 of the heat conduction member 130 is smaller than an area of the second contact surface 132, and an area of the heat absorption surface 121 of the thermoelectric cooler 120 is larger than an area of the light modulator 300 in contact with the first contact surface 131. In other words, in this embodiment, the heat conduction member 130 having a trapezoidal or stepped cross-section abuts between the light modulator 300 and the thermoelectric cooler 120, so that the heat may be transferred from the light modulator 300 to the thermoelectric cooler 120 smoothly and quickly, in addition to structural adaptation of the dimensions of the light modulator 300 and the thermoelectric cooler 120. Accordingly, the second side surface 133 (in this embodiment) of the heat conduction member 130 forms three stepped sections A1, A2, and A3, all covered by the sealant 140. Similarly, the area of the second contact surface 132 of the heat conduction member 130 is larger than the area of the heat absorption surface 121 of the thermoelectric cooler 120, and the sealant 140 further covers a part of the second contact surface 132, and the part of the second contact surface 132 is not in contact with the heat absorbing surface 121 of the thermoelectric cooler 120 to achieve the required isolation effect. In addition, the light modulator 300 may be disposed on a circuit board 320, the circuit board 320 is, for example, located on a surface of the light modulator 300 facing the thermoelectric cooler 120 and next to the first contact surface 131 of the heat conduction member 130, and the sealant 140 also covers the circuit board 320 to make the circuit board 320 airtight and isolated.

Figure 4:
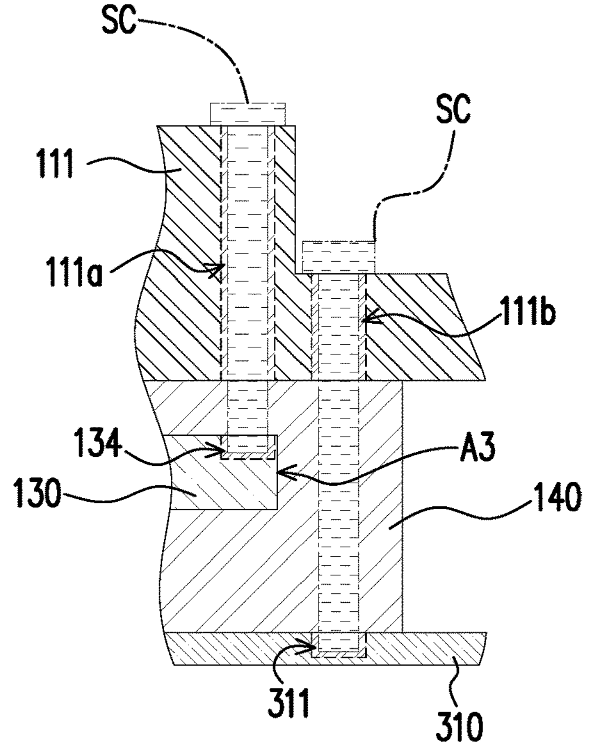
FIG. 4 is a partial enlarged diagram of FIG. 3.

FIG. 4 is a partial enlarged diagram of FIG. 3, mainly using the right side of FIG. 3 as an example, and the left side of FIG. 3 is omitted for having the same structural features. Referring to FIG. 3 and FIG. 4 at the same time, in this embodiment, the heat dissipation module 100 further includes multiple locking elements SC. The heat dissipation member 110 includes multiple first keyholes 111*a* corresponding to the locking elements SC, the heat conduction member 130 includes multiple second keyholes 134 corresponding to the locking elements SC, and the first keyholes 111*a* and the second keyholes 134 correspond to each other. Each of the locking elements SC is attached to one of the first keyholes 111*a* of the heat dissipation member 110 and one of the second keyholes 134 of the heat conduction member 130 to securely clamp the thermoelectric cooler 120 between the heat dissipation member 110 and the heat conduction member 130. At the same time, multiple gaps are formed between the locking elements SC, the first keyholes 111*a*, and the second keyholes 134, and the sealant 140 is filled in the gaps to ensure the isolation effect, as shown in FIG. 4.

Similarly, the heat dissipation member 110 further includes multiple third keyholes 111*b* corresponding to the locking elements SC. A support 310 of the heat source includes multiple fourth keyholes 311 corresponding to the locking elements SC, and the third keyholes 111*b* and the fourth keyholes 311 correspond to each other. The support 310 is, for example, a part of a casing (not fully shown) of an optical engine module of the projection device 10 to support or hold the heat source. Each of the locking elements SC is attached to one of the third keyholes 111*b* of the heat dissipation member 110 and one of the fourth keyholes 3311 of the support 310 of the heat source to secure the thermoelectric cooler 120 and the heat conduction member 130 between the heat dissipation member 110 and the support 310 of the heat source. Multiple gaps are formed between the locking elements SC, the third keyholes 111*b*, and the fourth keyholes 331, and the sealant 140 is filled in the gaps to ensure the isolation effect.

As can be seen from FIG. 3 and FIG. 4, while the locking elements SC are firmly bonded to the relevant components according to this embodiment, the sealant 140 is further filled in the gaps between the locking elements SC and the keyholes, and thus increase the strength of the overall locking structure, and due to the characteristics of the sealant 140, the sealant 140 is filled smoothly with good fluidity into the gaps. The sealant 140 also provides airtightness between the components after curing, and may be easily removed during rework, increasing reusability of the components.

Figure 5:
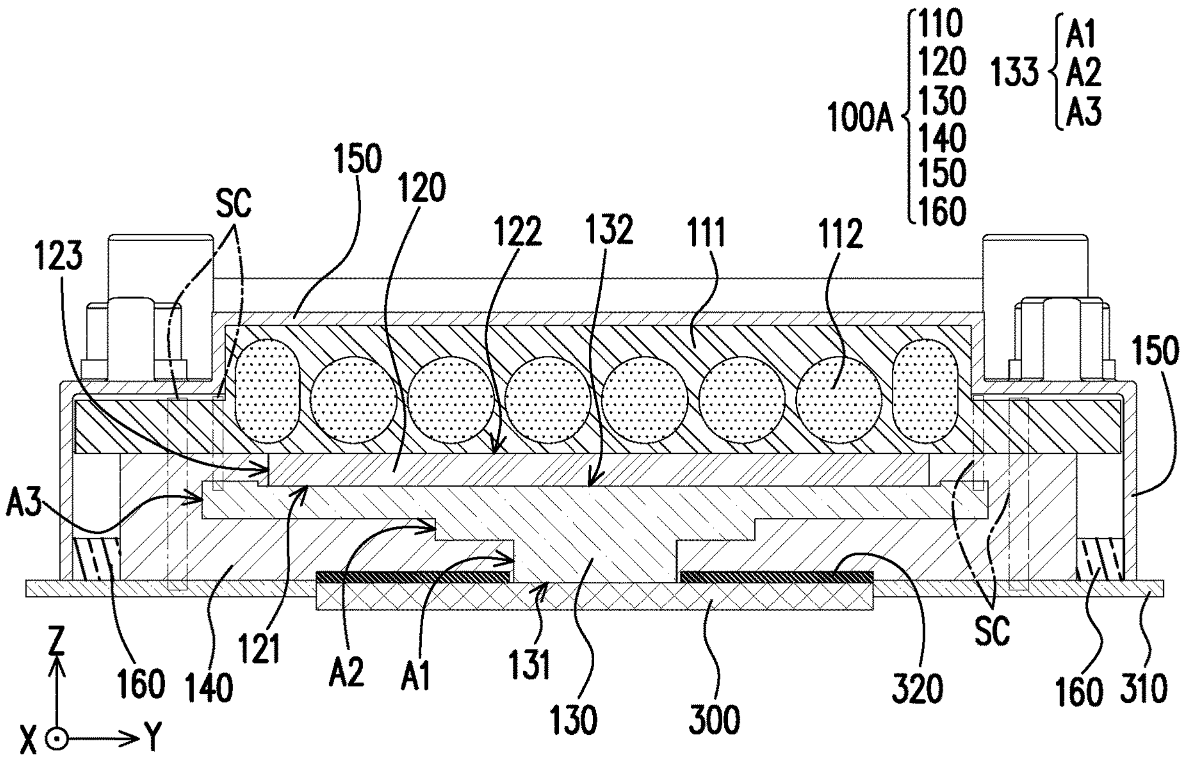
FIG. 5 is a partial cross-sectional diagram of an internal structure of a projection device according to another embodiment.

FIG. 5 is a partial cross-sectional diagram of an internal structure of a projection device according to another embodiment. In addition to the same components as the previous embodiment, a heat dissipation module 100A according to this embodiment further includes a packaging material 150 and a buffer material 160. The packaging material 150 is disposed on the support 310 of the heat source to cover the heat dissipation member 110, the thermoelectric cooler 120, the heat conduction member 130, and the sealant 140. The buffer material 160 is filled between the packaging material 150, the support 310 of the heat source, and the sealant 140. In addition to the same effect as the previous embodiment, this embodiment provides protection to the internal components by the packaging material 150 and the buffer material 160, and also improves the airtightness and isolation of an area (or space) where the sealant 140 is applied. In this embodiment, the packaging material 150 is, for example, rubber, and the buffer material 160 is, for example, sponge.

Figure 6:
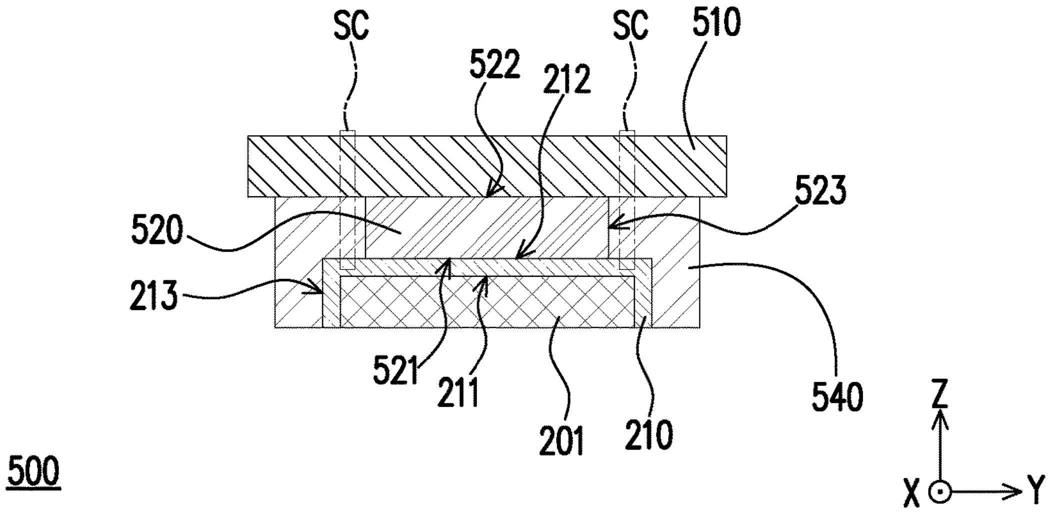
FIG. 6 is a partial cross-sectional diagram of an internal structure of a projection device according to another embodiment.

FIG. 6 is a partial cross-sectional diagram of an internal structure of a projection device according to another embodiment. Referring to FIG. 6, in this embodiment, a light source module 201 disposed in the illumination system 200 is used as a heat source, and the light source module 201 is carried on a support 210 and the support 210 is used as the heat conduction member 130 as in the previous embodiment, i.e., the support 210 has a heat conduction function. Here, a thermoelectric cooler 520 has a heat absorbing surface 521, a heat dissipating surface 522, and a first side surface 523. The support 210 has a first contact surface 211, a second contact surface 212, and a second side surface 213. Thus, as shown in FIG. 6, the heat generated by the light source module 201 is sequentially transmitted to the heat dissipation member 510 through the first contact surface 211 of the support 210, the second contact surface 212, the heat absorbing surface 521 of the thermoelectric cooler 520, and the heat dissipating surface 522. Similar to the previous embodiment, a sealant 540 is filled between the heat dissipation member 110 and the heat source, and surrounds and covers the first side surface 523 of the thermoelectric cooler 520 and the second side surface 213 of the support 210 to achieve the required airtightness and isolation effect. In addition, the locking elements SC are used to bond the heat dissipation member 510 and the support 210 and securely clamp the thermoelectric cooler 520 therein, and the resulting effect and detailed structural features are as shown in FIG. 3 and FIG. 4, and therefore will not be repeated in the following.

To sum up, in the embodiments of the disclosure, in order to dissipate heat from the heat source (the light source module or the light modulator) in the projection device, the heat dissipation module is abutted between the heat source and the heat dissipation member by the heat conduction member and the thermoelectric cooler. The heat dissipation module is further provided with the sealant applied to the space between the heat dissipation member and the heat source, and covers the side surface of the thermoelectric cooler and the side surface of the heat dissipation member to provide airtightness and insulation between the thermoelectric cooler and the heat dissipation member. In other words, this prevents the possibility of contact between the thermoelectric cooler and the heat conduction member with the external environment, and avoids heat dissipation from multiple locations. Conversely, the thermoelectric cooler and the heat conduction member act as intermediate media for transferring the heat generated by the heat source to the heat dissipation member, and may achieve airtightness and thermal insulation through the sealant.

Further, when a thermoelectric cooler is used as a means of heat dissipation in the projection device, the presence of the sealant may effectively prevent a heat absorbing surface (cooling end) of the thermoelectric cooler from condensation due to contact with a high temperature environment, so as to avoid water vapor from affecting or even damaging internal related components of the projection device.

In addition, when the heat dissipation module is bonded to the relevant components through the locking elements, the sealant is further provided to fill the gaps between the locking elements and the keyholes, which not only serves as the strength of the locking structures and improves the airtightness, but also makes the sealant at the locking elements or the keyholes easily removable due to the characteristics of the sealant, which facilitates rework and increases the reusability of the components.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby enabled per in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the invention", "the disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Furthermore, no element and component in the present disclosure is intended to be dedicated to the public regardless of whether the element or component is explicitly recited in the following claims.

What is claimed is:

1. A heat dissipation module disposed in a projection device to dissipate heat from a heat source, the heat dissipation module comprising:

a heat dissipation member;

a thermoelectric cooler;
a heat conduction member; and
a sealant;
wherein, the thermoelectric cooler has a heat absorbing surface, a heat dissipating surface, and a first side surface, the first side surface is adjacent to and located between the heat absorbing surface and the heat dissipating surface,
wherein the heat dissipating surface of the thermoelectric cooler contacts the heat dissipation member, the heat conduction member has a second side surface, a first contact surface and a second contact surface opposite to the first contact surface, the second side surface is adjacent to and located between the first contact surface and the second contact surface,
wherein the first contact surface contacts the heat source, and at least part of the second contact surface contacts the heat absorbing surface of the thermoelectric cooler; and the sealant is filled between the heat dissipation member and the heat source to cover the first side surface of the thermoelectric cooler and the second side surface of the heat conduction member, the heat generated by the heat source is sequentially transmitted to the heat dissipation member through the first contact surface and the second contact surface of the heat conduction member and the heat absorbing surface and the heat dissipating surface of the thermoelectric cooler.

2. The heat dissipation module according to claim 1, wherein the first side surface surrounds the heat absorbing surface and the heat dissipating surface, and the second side surface surrounds the first contact surface and the second contact surface.

3. The heat dissipation module according to claim 1, wherein the sealant is a compressed elastomer after curing, and Shore hardness of the sealant after curing is less than 80.

4. The heat dissipation module according to claim 1, wherein viscosity of the sealant before curing is between 300 centipoise (cp) and 12000 centipoise (cp).

5. The heat dissipation module according to claim 1, wherein thermal conductivity of the sealant is less than 10 W/m·K.

6. The heat dissipation module according to claim 1, wherein an area of the first contact surface of the heat conduction member is smaller than an area of the second contact surface, and an area of the heat absorbing surface of the thermoelectric cooler is larger than an area of the heat source in contact with the first contact surface.

7. The heat dissipation module according to claim 1, wherein an area of the second contact surface of the heat conduction member is larger than an area of the heat absorbing surface of the thermoelectric cooler, and the sealant further covers a part of the second contact surface not in contact with the heat absorbing surface.

8. The heat dissipation module according to claim 1, further comprising a plurality of locking elements, wherein the heat dissipation member comprises a plurality of first keyholes corresponding to the plurality of locking elements, the heat conduction member comprises a plurality of second keyholes corresponding to the plurality of locking elements, each of the plurality of locking elements is attached to one of the plurality of first keyholes of the heat dissipation member and one of the plurality of second keyholes of the heat conduction member, a plurality of gaps are formed between the plurality of locking elements, the plurality of first keyholes, and the plurality of second keyholes, and the sealant is filled in the plurality of gaps.

9. The heat dissipation module according to claim 1, further comprising a plurality of locking elements, wherein the heat dissipation member comprises a plurality of third keyholes corresponding to the plurality of locking elements, a support of the heat source comprises a plurality of fourth keyholes corresponding to the plurality of locking elements, each of the plurality of locking elements is attached to one of the plurality of third keyholes of the heat dissipation member and one of the plurality of fourth keyholes of the support of the heat source to secure the thermoelectric cooler and the heat conduction member between the heat dissipation member and the support of the heat source, wherein a plurality of gaps are formed between the plurality of locking elements, the plurality of third keyholes, and the plurality of fourth keyholes, and the sealant is filled in the plurality of gaps.

10. The heat dissipation module according to claim 1, further comprising a packaging material and a buffer material, wherein the packaging material is disposed on a support of the heat source to cover the heat dissipation member, the thermoelectric cooler, the heat conduction member, and the sealant, and the buffer material is filled between the packaging material, the support of the heat source, and the sealant.

11. A projection device comprising:
an illumination system;
a light modulator;
a heat dissipation module; and
a projection lens,
wherein:
the illumination system is configured to generate an illumination beam,
the light modulator is located on a transmission path of the illumination beam to convert the illumination beam into an image beam, and
the projection lens is located on a transmission path of the image beam to project the image beam out of the projection device;
wherein:
the heat dissipation module is configured to dissipate heat from a heat source disposed in the projection device,
the heat source is a light source module of the illumination system or the light modulator, and
the heat dissipation module comprises a heat dissipation member, a thermoelectric cooler, a heat conduction member, and a sealant;
wherein;
the thermoelectric cooler has a heat absorbing surface, a heat dissipating surface, and a first side surface, the first side surface is adjacent to and located between the heat absorbing surface and the heat dissipating surface,
the heat dissipating surface of the thermoelectric cooler contacts the heat dissipation member;
the heat conduction member has a second side surface, a first contact surface and a second contact surface opposite to the first contact surface, the second side surface is adjacent to and located between the first contact surface and the second contact surface,
wherein:
the first contact surface of the heat conduction member contacts the heat source,
at least part of the second contact surface contacts the heat absorbing surface of the thermoelectric cooler; and
the sealant is filled between the heat dissipation member and the light modulator or between the heat dissipation member and the light source module to cover the first side surface of the thermoelectric cooler and the second side surface of the heat conduction member, wherein:

the heat generated by the heat source is sequentially transmitted to the heat dissipation member through the first contact surface and the second contact surface of the heat conduction member and the heat absorbing surface and the heat dissipating surface of the thermoelectric cooler.

12. The projection device according to claim 11, wherein the first side surface surrounds the heat absorbing surface and the heat dissipating surface, and the second side surface surrounds the first contact surface and the second contact surface.

13. The projection device according to claim 11, wherein the sealant is a compressed elastomer after curing, and Shore hardness of the sealant after curing is less than 80.

14. The projection device according to claim 11, wherein viscosity of the sealant before curing is between 300 centipoise (cp) and 12000 centipoise (cp).

15. The projection device according to claim 11, wherein thermal conductivity of the sealant is less than 10 W/m·K.

16. The projection device according to claim 11, wherein an area of the first contact surface of the heat conduction member is smaller than an area of the second contact surface, and an area of the heat absorbing surface of the thermoelectric cooler is larger than an area of the heat source in contact with the first contact surface.

17. The projection device according to claim 11, wherein an area of the second contact surface of the heat conduction member is larger than an area of the heat absorbing surface of the thermoelectric cooler, and the sealant further covers a part of the second contact surface not in contact with the heat absorbing surface.

18. The projection device according to claim 11, further comprising a plurality of locking elements, wherein the heat dissipation member comprises a plurality of first keyholes corresponding to the plurality of locking elements, the heat conduction member comprises a plurality of second keyholes corresponding to the plurality of locking elements, each of the plurality of locking elements is attached to one of the plurality of first keyholes of the heat dissipation member and one of the plurality of second keyholes of the heat conduction member, a plurality of gaps are formed between the plurality of locking elements, the plurality of first keyholes, and the plurality of second keyholes, and the sealant is filled in the plurality of gaps.

19. The projection device according to claim 11, further comprising a plurality of locking elements, wherein the heat dissipation member comprises a plurality of third keyholes corresponding to the plurality of locking elements, a support of the heat source comprises a plurality of fourth keyholes corresponding to the plurality of locking elements, each of the plurality of locking elements is attached to one of the plurality of third keyholes of the heat dissipation member and one of the plurality of fourth keyholes of the support of the heat source to secure the thermoelectric cooler and the heat conduction member between the heat dissipation member and the support of the heat source, wherein a plurality of gaps are formed between the plurality of locking elements, the plurality of third keyholes, and the plurality of fourth keyholes, and the sealant is filled in the plurality of gaps.

20. The projection device according to claim 11, further comprising a packaging material and a buffer material, wherein the packaging material is disposed on a support of the heat source to cover the heat dissipation member, the thermoelectric cooler, the heat conduction member, and the sealant, and the buffer material is filled between the packaging material, the support of the heat source, and the sealant.

* * * * *